United States Patent
Braun

(10) Patent No.: US 6,379,546 B1
(45) Date of Patent: Apr. 30, 2002

(54) METHOD AND DEVICE FOR SEWAGE TREATMENT

(76) Inventor: Ulrich Braun, P.O. Box 86 07 67, 81634 Munchen (DE)

( * ) Notice: Subject to any disclaimer, the term of this patent is extended or adjusted under 35 U.S.C. 154(b) by 0 days.

(21) Appl. No.: 09/445,249

(22) PCT Filed: Jun. 3, 1998

(86) PCT No.: PCT/EP98/03316

§ 371 Date: Jun. 5, 2000

§ 102(e) Date: Jun. 5, 2000

(87) PCT Pub. No.: WO98/55402

PCT Pub. Date: Dec. 10, 1998

(30) Foreign Application Priority Data

| Jun. 4, 1997 | (DE) | 197 23 477 |
| Nov. 4, 1997 | (DE) | 197 48 691 |
| Nov. 27, 1997 | (DE) | 197 52 588 |
| Feb. 3, 1998 | (DE) | 198 04 040 |

(51) Int. Cl.$^7$ ................. C02F 1/44; C02F 9/00
(52) U.S. Cl. ........... 210/607; 210/620; 210/631; 210/650; 210/167; 210/195.2; 210/196
(58) Field of Search ................... 210/607, 620, 210/631, 650, 651, 167, 170, 195.1, 196, 202, 195.2, 257.2

(56) References Cited

U.S. PATENT DOCUMENTS

| 3,543,294 | A | * | 11/1970 | Boester | 210/170 |
| 3,666,105 | A | * | 5/1972 | Green | 210/201 |
| 3,797,667 | A | * | 3/1974 | Rod | 210/304 |
| 3,927,425 | A | * | 12/1975 | Delaney et al. | 210/195.1 |
| 3,950,249 | A | * | 4/1976 | Eger et al. | 210/197 |
| 4,017,395 | A | * | 4/1977 | Davis | 210/167 |
| 4,070,714 | A | * | 1/1978 | Bishton, Jr. et al. | 210/167 |
| 4,210,528 | A | * | 7/1980 | Coviello et al. | 210/195.1 |
| 4,228,006 | A | * | 10/1980 | Hanna | 210/167 |
| 4,246,101 | A | * | 1/1981 | Selby, III | 210/615 |
| 4,465,594 | A | * | 8/1984 | Laak | 210/919 |
| 4,501,665 | A | * | 2/1985 | Wilhelmson | 210/170 |
| 4,505,813 | A | * | 3/1985 | Graves | 210/202 |
| 4,812,237 | A | * | 3/1989 | Cawley et al. | 210/650 |
| 4,904,387 | A | * | 2/1990 | Jordan | 210/167 |
| 5,114,586 | A | * | 5/1992 | Humphrey | 210/202 |
| 5,192,428 | A | * | 3/1993 | Lindstrom | 210/170 |
| 5,254,246 | A | * | 10/1993 | Rivelli et al. | 210/202 |
| 5,498,330 | A | * | 3/1996 | Delle Cave | 210/167 |
| 5,626,745 | A | * | 5/1997 | Hawkinson | 210/202 |
| 5,868,937 | A | * | 2/1999 | Back et al. | 210/651 |

FOREIGN PATENT DOCUMENTS

WO          97/03023          *  1/1997

* cited by examiner

Primary Examiner—Christopher Upton
(74) Attorney, Agent, or Firm—Pillsbury Winthrop LLP

(57) ABSTRACT

The present invention relates to a process for utilizing waste waters which comprises the separate collection of gray water and/or black water and membrane filtration of the separately collected gray water and/or solids/liquid separation of the separately collected black water. The present invention preferably relates to a process for producing potable water from gray water or one or more of its partial streams. Moreover, an apparatus for producing potable water from gray water and an apparatus for utilizing black water and its use is described.

27 Claims, 4 Drawing Sheets

METHOD AND DEVICE FOR SEWAGE TREATMENT

FIELD OF THE INVENTION

The present invention relates to a process for utilizing waste waters which comprises the separate collection of gray water and/or black water and membrane filtration of the separately collected gray water and/or the solids/liquid separation of the separately collected black water. The present invention preferably relates to a process of producing potable water from gray water or from one or more of its partial streams. Moreover, an apparatus for producing potable water from gray water and an apparatus for utilizing black water and its use are described.

SUMMARY OF THE INVENTION

The present method comprises the treatment and recycling of the separately collected individual waste water streams of gray water and black water, which is preferably divided into faecal waste water and urinal waste water and can be separately collected, in order to thus provide a precondition for a highly efficient water management in regions with water problems.

The process is preferably based on the separate routing of black and gray waters and also preferably on the use of water-saving toilets.

The gray water can be used to produce potable water. The individual partial gray water streams can be pretreated separately and used to produce potable water. One aspect of the process is the use of sea water desalinization plants in the treatment of gray water. The effects achieved in the desalinization plant are not only a substantial removal of residual substances and simultaneous sanitation, but also a great reduction of the osmotic pressure.

The basic idea underlying the process is the maximization of the mineral fertilizer concentration by open liquid circulation by collecting the waste water together with the organic waste fraction in the discharge of waste water treatment plants.

The nutrients of the urinal waste water can be separately collected by separation toilets and urinals and can be anaerobically recovered. The black or faecal waste water is oxidized to nitrification and is reused to flush toilets and urinals, and is thus only used as a transportation means, in which the nutrients can be concentrated and discharged. Moreover, nitrate can be used as a flotation aid of the solids in the anaerobic first solids/liquid separation. In the case of composting, there is an additional cycle. This liquid cycle starts with the irrigation of the compost with the effluent from an aerobic waste water treatment step. The nutrients released by composting are thus washed away and concentrated in the outlet of the waste water treatment plant by irrigation water supplied to the aerobic treatment step. Suitable measures to greatly prevent denitrification can also be taken depending on the process variant. The theoretically smallest discharge volume of about 2 l/(PE*d) and the thus possible drying of the mineralized nutrient enables treatment without difficulties and odorless recycling of the nutrients into the nutrient cycle.

Bio waste is processed together with any resulting sludges in order to produce bio gas and compost.
The starting substrates
Definitions Waste and dirty waters are the sum parameters of all types of individual waste streams of industrial or domestic origin. The following individual waste water streams are of particular interest here:

Faecal waste water is defined as waste water which is only laden with feces (for instance from the feces outlet of urine separation toilets); other waste waters of similar composition stemming from other sources can be admixed here.

Urinal waste water is defined as waste water which is only laden with urine and stems from all kinds of urinals and/or from the urine-laden outlet of urine separation toilets; in this case, too, other waste waters of similar composition stemming from other sources can be admixed.

Black water is defined as waste water laden with both urine and feces, for instance from all kinds of toilets and urinals. Urinal waste water and/or faecal waste water can be drained and collected in a separate sewerage net. Moreover, the black water and/or its partial streams of urine waste water and faecal waste water can be received in surges in the same sewerage nets, and treated separately. In cases of particular similarity regarding pollution parameters, other waste waters from agriculture (for instance liquid pig manure) and/or from other sources can be admixed.

Gray water is defined as domestic waste water which is not or hardly laden with urine and/or feces and/or is defined as other waste water of similar composition stemming from laundries and/or other sources, which can be received in one or several separate sewerage nets. According to its origin and/or composition it can be subdivided into several grey water partial streams. The gray water can be composed of all conceivable combinations of all conceivable numbers of domestic and similar waste water sources, but must not contain black water (feces and/or urine), although a portion of faecal and/or urinal waste water admixed to one or several partial streams of the gray water does not make a difference to this definition.

Toilet as used herein is the general term for all types of toilets. Toilets with water supply can be divided into flush toilets and water-saving toilets.

Flush toilets are conventional toilets which are commercially available today and may also be equipped with water-saving devices (for instance a water saving key).

Water-saving toilets are special constructions with a high water saving effect, such as for instance vacuum toilets, urine separation toilets, etc.

Urinals are all types of separate urine outlets with or without water flushing, as for instance simple runs, urinals with individual or automatic water flushing, water-free urinals, etc.

Bio waste is defined as solid, biologically degradable waste products which may contain biologically inert components.

Carbon as used herein is defined as referring to all organic carbon compounds (CSB and BSB) which may be contained in black and gray waters and in bio waste. It may also refer to carbonates.

Nitrogen as used herein is defined as referring to all organic and inorganic nitrogen compounds which may be contained in black water and gray water and in bio waste.

Phosphorus as used herein is defined as referring to all organic and inorganic phosphorus compounds which may be contained in black water and gray water and in bio waste.

Filtration covers all coarse screen and/or fine screen filters and/or membrane (filtration) methods that can be used in waste water purification and potable water recovery. It includes all filtration and/or membrane methods known to the a skilled person, such as ultra or microfiltration, which are for instance described in the ATV volumes, Ulmann's Enzyklopädie, and other technical literature and technical journals, for instance Korrespondenz Abwasser, etc., and/or available on the market. Furthermore, process-enhancing additives may be added.

Solids/liquid separation covers all separation processes of liquid and solid materials which can be used in domestic waste water purification and potable water recovery, as e.g. sedimentations, and which are suitable (hydrocyclone classifiers, for example, do not lend themselves to solids/liquid separation in larger people equivalents connection sizes). For instance all types of filtration processes including reverse osmosis and/or other membrane processes for solids/liquids separation can be used. They include all processes for solids/liquid separation known to a skilled person, such as for instance adsorption processes, precipitation, filtration and membrane processes, dedimentation and flotation processes etc., which are for instance described in the ATV volumes, Ullman's Enzyklopädie and other technical literature and technical journals, e.g. Korrespondenz Abwasser etc, and/or available on the market. Furthermore, process-enhancing additives may be added.

Fixed bed processes cover all processes in which microorganisms grow sessily on a fixed and/or mobile matrix, such as trickling filters, RBC (rotating bio contactor) filters and rotating discs, all types of soil filters, fluidized bed processes, sand filter, planted soil filters etc. They include all processes that are known to a skilled person, which are for instance described in the ATV volumes, Ullman's Enzyklopädie and other technical literature and technical journals, e.g. Korrespondenz Abwasser etc, and/or available on the market. Process-enhancing additive may also be added.

Activated material processes comprise all processes in which microorganisms float freely in the liquid to be treated, such as for instance activated sludge processes, SBR (sequencing batch reactor) plants etc. They include all microorganism-based oxidation processes which are known to a skilled person and are for instance described in the ATV volumes, Ullman's Enzyklopädie and other technical literature and technical journals, e.g. Korrespondenz Abwasser etc, and/or available on the market. Process-enhancing additive may also be added.

Oxidation by microorganisms, aerobic treatment step and wet oxidation are synonyms within the meaning of the present invention and are the generic terms of oxidative fixed bed and activated material processes and other nature-resembling processes. They include all processes that are known to a skilled person, such as microorganism-based oxidation, which are for instance described in the ATV volumes, Ullman's Enzyklopädie and other technical literature and technical journals, e.g. Korrespondenz Abwasser etc, and/or available on the market. Process-enhancing additive may also be added.

Removal carbon covers all processes for removing carbon from a liquid. It comprises all processes which are known to a skilled person, such as microorganism-based oxidation, e.g. adsorption processes, e.g. precipitation processes and e.g. chemical oxidation processes, etc, which are for instance described in the ATV volumes and other technical literature and technical journals, e.g. Korrespondenz Abwasser etc, and/or available on the market.

1.2 Comparison of the domestic waste water partial flows

Most people know little about the dirty water produced by our civilization. As a rule, they do not know that it can be composed of very different "waste waters". Within the meaning of this invention the term "partial stream of waste water" and the term "partial stream" are used as synonyms.

The following Table 1 is a compilation of the approximate distribution of black and gray water components. The columns "black water" and "grey water" show the percentage distribution of the waste water components.

TABLE 1

Profiles of black and grey waters

| Parameters | Black water | Gray water |
|---|---|---|
| amount | 20–30% | 70–80% |
| carbon | 50–60% | 40–50% |
| Total nitrogen | >99% | <1% |
| phosphorus | >99%* | <1%* |
| sulfur | >98% | <1% |
| microelements | >95% | <1% |
| path. bacteria | >99% | <1% |

* values for the use of phosphate-free detergents

The values indicated in Table 1 are maximum values which may vary in individual cases. The existing studies are not significant enough. Table 1 shows how little sense it makes to mix black water with gray water. In the case of lack of nutrients in gray water, or in any combination of partial streams of gray water, a part of the oxidized nutrients of the black water can be added for complete carbon degradation.

Table 2 shows the sources from which the individual loads of material come.

TABLE 2

Origin of pollutant loads

| Parameter source | carbon g/(E * d) | % | total nitrogen g/(PE * d) | % | phosphorus g(PE * 4) | % |
|---|---|---|---|---|---|---|
| gray water | 15 | 40 | >0.2 | >1 | — | — |
| feces | 17 | 46 | 1.5 | 11 | 0.6 | 43 |
| urine | 5 | 14 | 12.2 | 88 | 0.8 | 57 |
| total | 37 | 100 | 13.9 | 100 | 1.4 | 100 |

Table 2 shows the different loads of carbon, nitrogen and phosphorous from the sources "gray water", "feces" and "urine". The different load profile which the feces and urine sources have in respect of the carbon and nitrogen parameters justifies separate collection and/or treatment of the urinal waste water.

Black water

As mentioned before, waste water from toilets and urinals is termed black water. It is composed of feces, urine and water. Urine contains more than 80% of daily produced human nitrogen (urea) dissolved in water. Feces contain about 50% of the daily produced human carbon in solid form and more than 50% of the phosphorus and 10% of the nitrogen. Almost the whole range of pollutants can be found here: carbon, phosphorus and potassium primarily in the feces, nitrogen mainly in the urine. Moreover, black water contains pathogenic bacteria from the human intestinal tract (so-called coliform bacteria). The bacteria which are contained in the sedimented sludge, can be completely killed by subsequent fermentation and composting, the bacteria contained in the water must be sterilized to be killed completely.

Regarding quantity, black water amounts to about 30% of the total domestic waste water. However, this quantity can be reduced to less than 15% by the choice of suitable water-saving toilets. Here, the calculations should always be checked correctly. The construction costs and operation costs of the process could be dramatically reduced by the separation of the black water, but it is necessary to install a second sewerage net. However, since it can be installed in parallel with the sewerage net that must be installed anyway, only the costs for the pipes and minor additional costs for the construction of the conduit net arise in addition.

From a scientific point of view, feces and organic waste consist of the substances, life consists of: They primarily consist of carbon (C), oxygen (O), hydrogen (H), nitrogen (N), sulfur (S) and phosphorus (P), but also of a whole range of trace elements, such as for instance potassium (K). Here, the compositions vary depending on nutrition habits and/or economic conditions. Primarily carbon, nitrogen and phosphorus are environmentally relevant for water pollution. They are produced in an energy-intensive form and are expensively removed from the water by conventional sewage treatment plants.

Carbon is biologically converted in water into $CO_2$ by bacteria in the presence of oxygen. Thus, a great amount of oxygen is used up in this conversion. One consequence of this is that the fish in the water suffocate. Plants are able to assimilate and utilize the thus formed $CO_2$ from the air. Hence, carbon is not a fertilizer.

Nitrogen, phosphorus and potassium are factors in short supply in plant growth and are thus the main components of fertilizers. Potassium is environmentally inert in water, while nitrogen and phosphorus may lead to an explosion-like algae growth in waste water. Algae are also plants and thus assimilate carbon from the air, and in the presence of nutrients thus lead to a carbon-enrichment in water, which leads to the development of catabolic food chains and to a great oxygen depletion of water and thus to the death of fish. The term used is the water has "turned" or "eutrophied".

The nutrients are suitable fertilizers for agricultural use. Commercial mineral fertilizers inter alia consist of saltpeter ($KNO_3$) and phosphate ($PO_4$). Exactly these substances are produced by the process and may be returned in solute or solid form to the production.

Gray water

Gray water is the waste water from all other domestic sources (see the definitions above), such as showers, washbasins, washing machines, kitchen waste water etc. Gray water is practically nitrogen-free and phosphorus-free; hence it can be purified to highest quality with relatively little expenditure.

Waste water from dish-washers is usually allocated to gray water, but should be directed to black water because of its composition of pollutants.

The pollution of gray water compared to that of black water is minor and can be purified with relatively little expenditure. Gray water contains nitrogen impurities only in very low trace amounts and is considered to be practically free from phosphate, as predominantly phosphate-free detergents are used nowadays.

Gray water amounts to about 70 to 80% of the daily waste water produced and accounts for the largest quantity and is particularly suitable for recycling for the following reasons:
1. it is not contaminated with coliform bacteria
2. it involves no ethical problems for the consumer of potable water
3. it shows a low carbon pollution
4. it shows a minimum nitrogen and phosphorus pollution.

The production of potable water from gray water is particularly worthwhile for communities in countries where potable water is in short supply, as for instance in the Maledive Islands, where 1 m³ of potable water now costs more than 6 US $.

Bio waste

The amounts of bio waste vary considerably. For instance the amount in German communities is only about 200 g per inhabitant and per day, but is more 1.2 kg per day in Asian hotels. Bio waste contains the residual quantities of nitrogen and phosphorus not contained in black water.

Prior art

Control sewage treatment plants and centralized sewerages

Sewage treatment plants which purify waste waters that is to say which expensively remove waste water components and direct the purified water via rivers to the sea represent the state of the art. Hence, this water is admixed with salt and withdrawn from the fresh water cycle. In regions where water is in short supply, fresh water is for instance produced by sea-water desalinization plants where the process of the present invention offers an inexpensive alternative. The prior art covers a linear flow through technique and essentially suffers from the following drawbacks:

1. The most different types of waste waters from commerce, industry and households are admixed. Rain water is often also directed to the combined sewage system. The consequences of this admixture are that recovery and recycling of the nutrients from black water is impossible because of their admixture with poisonous industrial waste waters;

for the same reason, a poisonous sewage sludge is formed low-salt waste waters are directed to the sea via the surface water collectors and thus fresh water is wasted, producing considerable costs especially in regions where water is in short supply;

the low concentration of the waste water components requires their technically sophisticated and expensive removal;

non-purified waste waters are washed out by rain peaks.

2. Inflexibility of centralized systems. A rigid system cannot react swiftly to rapid changes in the requirements, as for instance in the booming touristic areas.

Decentralized separation of black and gray waters

Historically, black water was treated separately especially in Asia. In this connection, especially the bio gas plants of India and China and the "Nightsoil" treatment methods of Japan and Korea are to be mentioned. The process variations can be described as follows:

a) Heat treatment process

After coarse particle removal, the black water is passed to a quantitative equalization tank. After heating and subsequent solids/liquid separation, the black water is diluted with fresh water in a ration of 1:20, and subjected to an activated sludge process.

b) Anaerobic treatment (anaerobic digestion process)

After coarse particle removal and quantitative equalization, the black water is subjected to a two-stage anaerobic process and after subsequent solids/liquid separation is diluted with fresh water in a ratio of 1:20, and directed to an activated sludge process.

c) Aerobic process aerobic digestion process)

After coarse particle removal and quantitative equalization, the black water is subjected to aerobic treatment, and after subsequent solid/liquid separation the black water is diluted with fresh water in a ratio of 1:20, and subjected to an activated sludge process.

d) Two-stage activated sludge process

After coarse particle removal and quantitative equalization, the black water is diluted with water in a ratio of 1:10 and treated in a first activated sludge process. After subsequent solids/liquid separation the black water is again diluted with fresh water in a ratio of 1:10, and subjected to a second activated sludge process.

In recent times, the separation of black and gray water has been reduced to practice only in Norway and in the Federal Republic of Germany and only in a few projects.

e) Gray water processing

In Norderstedt, near Hamburg, black and gray waters were collected separately. The gray water is processed in a one-stage procedure, and just as the untreated black water, is then directed to a combines sewage system. The drawbacks of this process concept are the following aspects:

Gray water processing at best allows its reutilization as flush water for toilets and urinals.

The introduction of untreated black water makes it impossible to close the nutrient cycle.

f) Fermentation of black water and bio waste

At present, Lübeck plans a residential area in which black water is separated from gray water. It envisages fermentation of the total black water with bio waste and subsequent use of the fermentation broth in agriculture. The unfavourable C:N ratio is to be counteracted by an increase of the active bio mass in the anaerobic reactor. The drawbacks of the process in particular in the use in touristic areas with short water supplies are the following aspects:

Odorless application of the nutrients in the vicinity or on touristic grounds (for instance golf courses, parks, public gardens etc.) is not possible.

With a previous solids/liquid separation step, the volume of the bio gas plant could be reduced to about a fourth while operation stability could at the same time be increased because of the improved C:N ratio.

Water-saving in the toilet sector is only possible via the use of water-saving toilets, given the absence of a black water cycle.

g) Fermentation of black water and bio waste

A pilot plant for the solar residential area "am Schlierberg" working according to the same process as that of Lübeck (see below) was put into operation in Freiburg in May 1997. During the test phase, acidification tendencies on account of the too low C:N ratio were reported. Following the test results, the process according to FIG. 3 was modified end of 1997 by the engineers working on this project. The drawbacks of this process when used in touristic areas suffering from short water supplies are the same as in the case of the previously discussed process.

h) Aerobic black water oxidation

An aerobic thermophilic oxidation plant for total black water has been built in Norway near Oslo. The drawbacks of this process are the high energy consumption of the CSB fraction and the absence of bio gas production.

The processes known in the art are, however, inadequate for many waste water removal or utilization areas. Hence, it is an object of the invention to provide an improved process for waste water utilization. This object is achieved by the embodiments specified in the claims.

Thus, the invention relates to a process for utilizing waste waters, which comprises the following steps:

(a) separate collection of gray water and/or black water; and (b) membrane filtration of the gray water separately collected in (a) and/or solids/liquid separation of the black water separately collected in (a).

In a preferred embodiment of the invention, the process for producing potable water from gray water or from one or more of its partial streams comprises the following steps:

(a) separate collection of gray water or one or more of its partial streams; and (b) membrane filtration of the gray water separately collected in (a) or one or more of its partial streams.

In a particularly preferred embodiment, membrane filtration is carried out by reverse osmosis or ultra- or microfiltration.

In another particularly preferred embodiment the ultra- or microfiltration is followed by a desalinization step.

In another particularly preferred embodiment, membranes having a pore size of at the most 2 $\mu$m are used for ultra- or microfiltration.

In another particularly preferred embodiment, membranes having a pore size of at the most 0.2 $\mu$m are used for ultra- or microfiltration.

In another particularly preferred embodiment, one or more mechanical, physical and/or chemical purification steps precede (b).

In another particularly preferred embodiment the process according to (a) comprises the following steps:

(i) solids/liquid separation; and/or (ii) carbon removal

In another particularly preferred embodiment step (ii) is followed by solids/liquid separation.

In another particularly preferred embodiment, solids/liquid separation is carried out by flotation, sedimentation, filtration or precipitation.

In another particularly preferred embodiment, carbon removal is carried out by oxidation with the use of microorganisms.

In another particularly preferred embodiment, the process of invention comprises the following step subsequent to (b):

(c) sanitation and/or modification of the water structure of the gray water or one or more of its partial streams recovered in (b).

In another particularly preferred embodiment, sanitation is a treatment with chlorine.

In another preferred embodiment of the invention, black water utilization comprises the following steps:

(a) separate collection of black water from toilets with or without urinals;

(b) solids/liquid separation of the black water collected in (a);

(c) oxidation by microorganisms of the liquid phase recovered in (b);

(d) solids/liquid separation of the product obtained in (c);

(e) utilization of the liquid phase obtained in (d) (ea) for collecting black water according to (a); and/or (eb) as a mineral fertilizer; and (f) optional repetition of steps (a) to (ea) one or more times.

In a particularly preferred embodiment, the black water is separately collected in step (a) as faecal and urinal waste waters and the faecal waste water is treated according to steps (a) to (f).

In another particularly preferred embodiment of the invention, at least a part of the urinal waste water is added to the faecal waste water before step (c).

In another particularly preferred embodiment of the invention, the solids/liquid separation in (b) is a flotation process in the event that steps (a) to (ea) are repeated one or more times.

In other particularly preferred embodiments of the invention, one or more mechanical, physical and/or chemical purification steps precede step (c).

In another particularly preferred embodiment of the invention, the solids/liquid separation in (d) is a filtration process.

In another particularly preferred embodiment, the solids/liquid separation in (b) is a sedimentation or filtration process.

In another particularly preferred embodiment, the product from (d) is intermediately stored in a storage tank and in the case of a higher performance demand, is supplied again to the oxidation equipment under increased air supply.

In another particularly preferred embodiment, the oxidized black water and/or faecal waste water is subjected to sanitation prior to reutilization and/or to a modification of the water structure.

In another particularly preferred embodiment, the solids are removed from the urinal waste water by filtration.

In another preferred embodiment, the solids from the gray water and/or the black water and/or faecal waste water are subjected to a one or two-step anaerobic fermentation process together with or without fragmented bio waste.

In another particularly preferred embodiment, the potable water is filled into containers.

In another particularly preferred embodiment, the mineral fertilizer and/or compost is filled into containers.

Moreover, the invention relates to an apparatus for carrying out the process of the invention which comprises a reactor in which steps (b), (c) and (d) are carried out.

The apparatus according to the invention comprises membranes as explained above, as well as a mixer, an aerator, a scum offtake, and optionally other components.

In another particularly preferred embodiment, the apparatus comprises a separator in which the process steps characterized in the process of the invention are carried out.

Furthermore, the invention relates to the use of the apparatus of the invention for utilizing black water.

In another embodiment, the invention relates to the use of the apparatus of the invention in order to produce potable water from gray water.

THE FIGURES SHOW THE FOLLOWING

FIG. 1 shows the black water module and bio waste module. It depicts the black water cycle with or without urinal waste water. In addition, it shows the interaction with the bio waste treatment, the treatment of bio waste being a preferred embodiment of the process of the invention.

FIG. 2 shows the gray water module and its recycling for re-use. Thanks to the division of the gray water into three separate partial waste water streams, a voluminous preliminary sedimentation of the gray water can be prevented. The treatment of the gray water and one or more of its partial streams in a desalinization plant is an important process step. The desalinization plant can be used in the present process in a multifunctional way because of the low osmotic pressure. Process step 2*d* shows the optimum interaction with the bio waste module.

THE EXAMPLES ILLUSTRATE THE INVENTION

Figure 1:
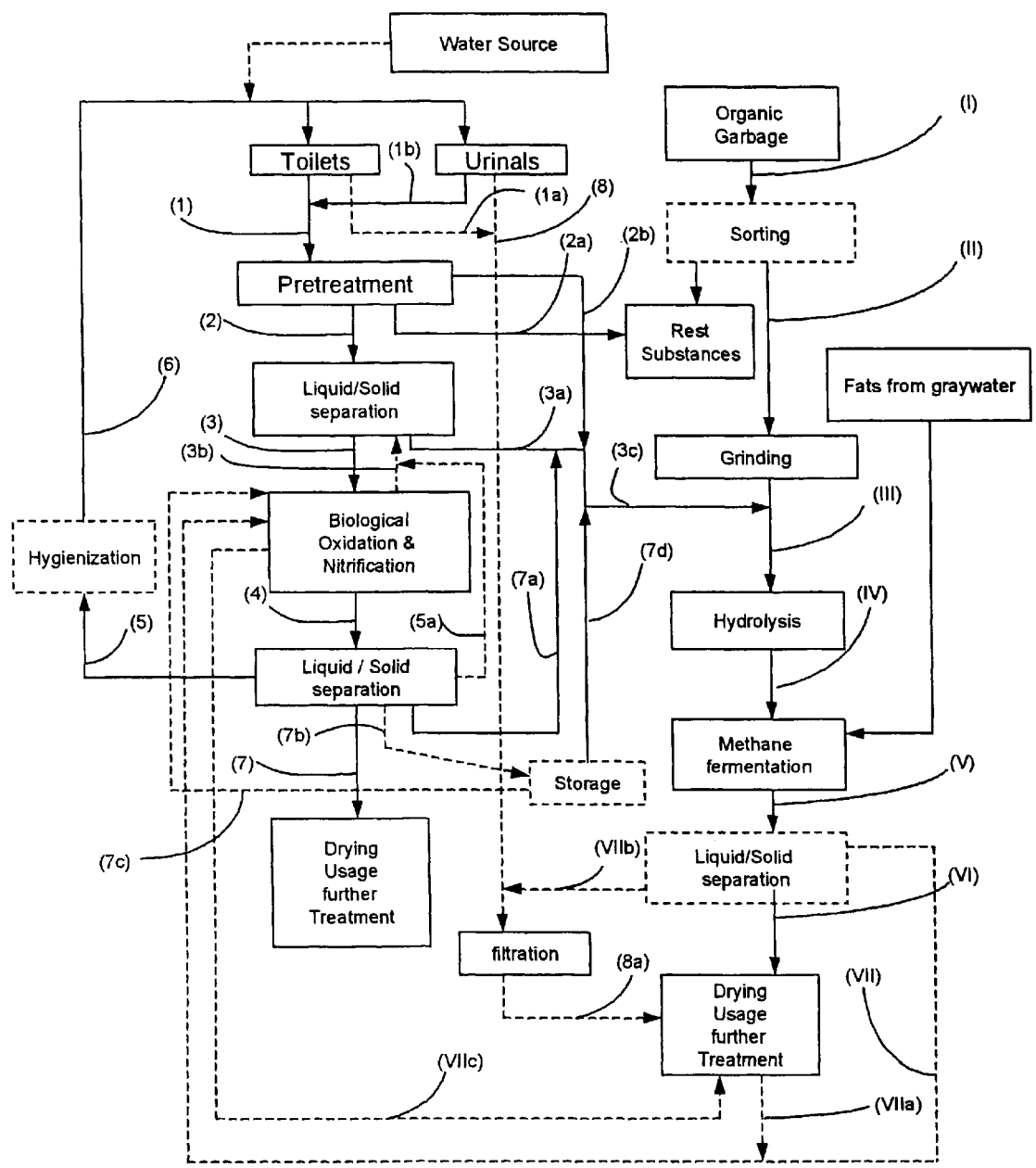
Figure 2:
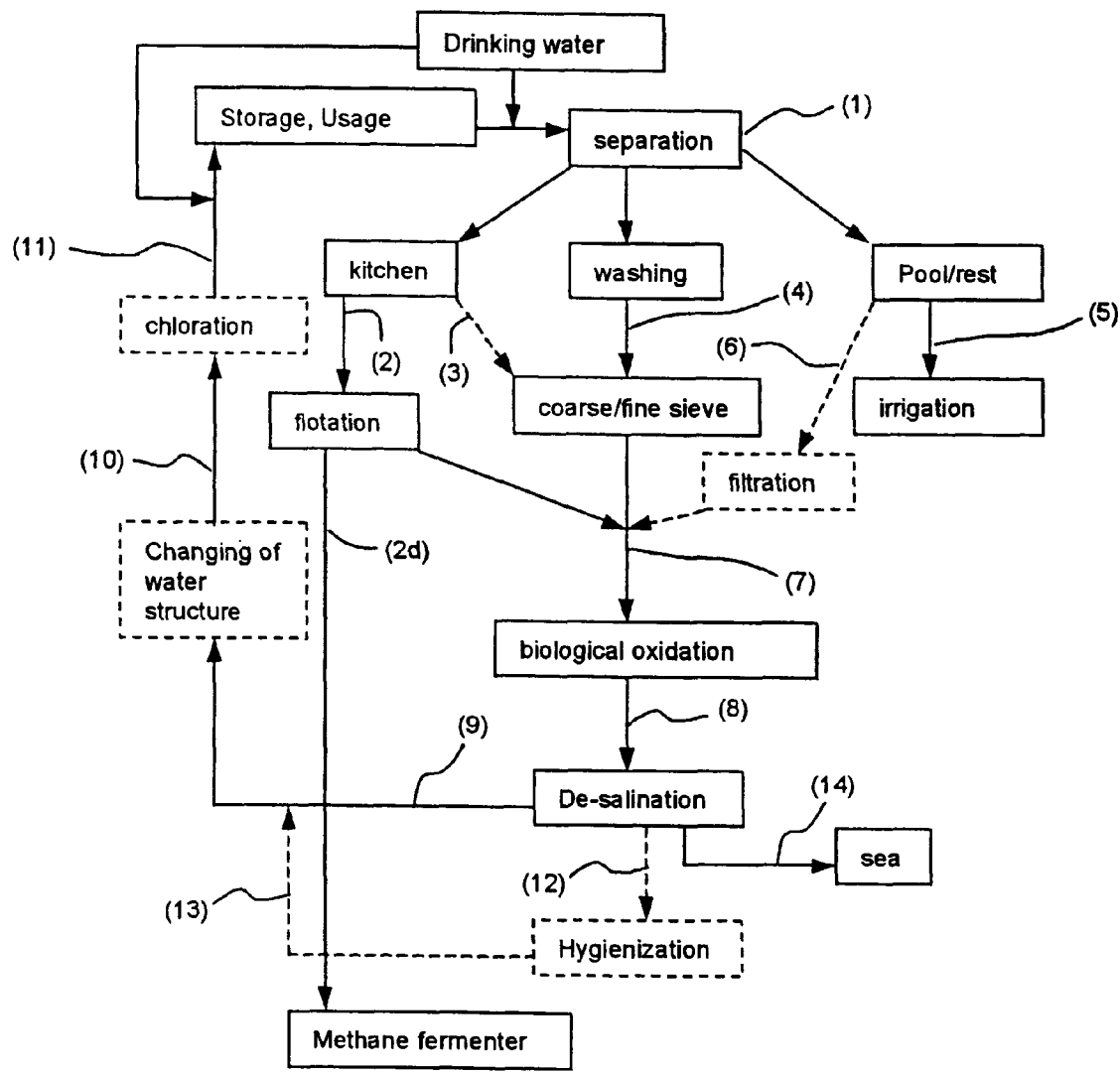

The process according to the invention is explained in more detail on the basis of FIGS. 1 and 2.

Optimum use of the new process herein proposed, requires the existence of a separate black and gray water discharge system. For instance in the case of hotel blocks, this discharge system to be newly installed in addition of the existing one should be easy to realize in the utility lines in the course of a renovation or new construction, while the hotel continues to operate, if the works are properly scheduled.

Sewerage nets and sewage treatment plants do not exist in all European touristic areas and those which exist are all completely overloaded by the steadily increasing tourism.

In recent times, infrastructures are developed in Southern Europe, which are similar to those built in other countries (for instance in Germany) in the fifties and sixties. Central sewerage nets are installed and central sewage treatment plants are newly built or improved.

However, such central solutions many times and in particular in touristic areas with high touristic growth rates are no permanent solutions, as central systems and plants cannot grow as rapidly as tourism. Hence, decentralized solutions, which permit flexible adaption of the capacity to the needs should on principle be sought.

The process herein proposed is so flexible that it can be implemented into an existing infrastructure at low costs. For instance existing central structures can be continued to be used for cost reasons and can be supplemented by the decentralized system in parallel to the central system.

EXAMPLE 1

The possibility of implementing the process in an infrastructure possessing a central sewage treatment plant and sewerage net A community possesses a central sewerage net, which is in reasonable conditions, and an (overloaded) central sewage treatment plant. In this case, the existing sewerage net can be used for collection and the sewage treatment plant can be used for processing the gray water. The black water from toilets and urinals is detached from the central system and collected in small decentralized systems and processed in black water modules and recycled. This does not only provide the possibility of reutilizing the gray water, but also results in a substantial increase in the capacity of the existing sewage treatment plant; overload is thus avoided and a good discharge quality ensured.

EXAMPLE 2

Possibility of implementing the process in an infrastructure without a central sewage treatment plant and sewerage net A community does not possess a waste water infrastructure, and consequently it possesses neither a sewage treatment plant nor a sewerage net. In this case, it is possible to use several complete process modules (black and gray water modules) in a decentralized manner (for instance in every major hotel or residential block).

Thus, the implementation of the process in local infrastructures should always be decided upon on a case by case basis, as it depends on many local factors, such as the infrastructure, price structure of waste water and potable water, possibly the water and fertilizer requirements in agriculture etc.

The following Table 3 shows some implementation possibilities in different existing infrastructures

TABLE 3

Implementation possibilities in existing infrastructures

Potable water supply situation

| Existing Infrastructure | Extreme water shortage | Water Shortage | No water shortage |
|---|---|---|---|
| No sewage treatment plant; no sewerage net | small decentralized black and gray water systems and standardized bio converter modules | small decentralized black and gray water systems and standardized bio converter modules | small decentralized black and gray water systems; standardized black water modules and planted soil filters for gray water |
| Old sewage treatment plant; old sewerage net | detachment of black water by small decentralized black water systems end standardized black water modules; utilization and improvement of existing infrastructure for gray water optionally direction into the desalinizatian plant | detachment of black water by small decentralized black water systems and standardized black water modules; utilization and improvement of existing infrustructure for gray water and optionally percolation or irrigation | small decentralizad black water systems with planted soil filters; utilization of existing infrastructure for gray water purification |
| New sewage treatment plant, new sewerage net | detachment of black water by small decentralized black water systems and standardized black water modules; utilization and improvement of existing infrastructure for gray water, optionally direction into the desalinizatien plant | detachment of new constructions by small decentralized black water systems and standardizad black water modules: utllizatlon of existing intrastructure for mixed water purification. Aiming at long-term separatian of gray water and black water. | an individual cost benefit analysis needs to be prepared |

FIG. 1: The black water and bio waste modules

The process and the apparatus should preferably be placed as a compact module into the basements of houses accommodating one or more families, and thus no waste water sewerage net whatsoever needs to be installed.

The process is preferably based on the separate discharge of black and gray waters and also preferably on the use of water-saving toilets. The processed waste water and/or preferably black water can be applied to green areas and/or directed to the ground water after optional sanitation or disinfection.

The black water and bio waste modules are highly interrelated, and therefore it would appear expedient to describe them together. The dashed arrows or boxes in the process in FIG. 1 represent options or process variants.

The black water stream

The process is preferably used when the number of toilets exceed 20. The aim of this partial-stream-process is the production of mineral fertilizer, compost and bio gas from black water. The most essential crucial point of the process is the black water cycling between toilets, solids/liquid separation, oxidation (oxidation by means of microorganisms and/or carbon removal) and solids/liquid separation. Hence, the loads of nutrients can be concentrated as desired, with the result that the volume in which the nutrient loads are dissolved is very small. Another characteristic feature of the partial-stream-process is the solids/liquid separation of black water and the black water cycle for compost water, all of which is explained in the following list of process steps on the basis of FIG. 1. The numbers in the description correspond to those of the correspondingly numbered process steps of FIG. 1.

Process steps (1) to (6) show the black water cycle with oxidative nutrient production without the use of separation toilets (fat arrows). Process step (7) shows the discharge of the oxidized liquid fertilizer. Where urine separation toilets are used, process steps (1) to (6) show the faecal water cycle. Process step (1a) shows the urine discharge from the separation toilet. Process step (1b) is dispensed with in this case.

Process steps (1a), (8) and (8a) show the process using urine separation toilets with reductive nutrient production. The thin solid arrows show the solids streams (sludges, etc). Process steps (2a), (2b), (3a), (7a) and (7b) lead to (3c) and show the solids discharge from the black water module into the bio waste stream. However, the solids sources can be added in all conceivable combinations before fragmentation, and/or before hydrolysis and/or before methane fermentation.

(1) shows the combination of faecal and urinal waste water. The sphere of application of the process proposed herein is not restricted to particular toilets and urinals, but encompasses all types of water-flush toilets and urinals. Urinal waste water can also be separately discharged and treated, as will be explained furtheron on the basis of process step (8).

Where necessary, one or more mechanical, physical and/or chemical presettling processes which may also produce fermentable sludges, may be carried out first (2b). The pretreatment processes should, however, be as gentle as possible in order to improve and/or not to destroy the coarse solids structure of the black water. Residues are separated (2a) and can be further processed.

(2) In this process step, the possibly pretreated black water is directed to suitable solids/liquid separation. In the case that for instance no nutrients are to be recovered from the black water cycle, the nitrate may be used for denitrification. In this case, solids/liquid separation can particularly preferably be carried out by anaerobic flotation.

In this case, flotation, sedimentation and/or filtration processes are preferably used for solids/liquid separation.

The separable carbon in the sludge of the black water (it can be added in the bio gas production; (3a) & (3c)) is thus separated from the bulk of nitrogen of urine in the liquid phase, which is important for the operational stability of the bio gas plant.

(3) The black water from process step (2) is now subjected to oxidation by microorganisms and/or to carbon removal. The aerobic treatment step (oxidation by microorganisms and/or carbon removal) can also be initiated with all combinations or any combustion of waste water partial streams. Thus, the residual carbon which is dissolved in the black water escapes as $CO_2$ gas. The oxidation by microorganisms also comprises nitrification (urea is oxidized to nitrate). Here, the liquid phase from the bio gas plant from process step (VII) can be supplied and oxidized.

Preferably, an activated material process is used here, which works with a high amount of dry substance (about 15 $kg_{oTS}/m^3$) of active bio mass in order to keep the reactor volume small. However, in this case the later solids/liquid separation process (4) has to meet special requirements. The oxidation by microorganisms and/or the removal of carbon and nitrogen can be carried out in one or two steps, and in the case of two steps can also comprise several steps, with all combinations of fixed bed process and activated material processes being possible here.

The solids/liquid separation of process step (2) and the oxidation by microorganisms (3) can preferably be carried out in the same apparatus.

Nitrification proceeds smoothly and optimally only within a very small pH window between pH 6 and 7. In the acidic range, the nitrifying bacteria are inhibited by $HNO_2$-N, and in the basic range they are inhibited by $NH_3$-N. The nitrification process is accompanied by a lowering of the pH in the medium. Due to the supply amounts depending on the toilets used (vacuum toilets: 7–10 l/(PE*d), flush toilet: 30–60 l/(PE*d) and the oxidation reactor sizes depending on the solids/liquid separation process used in process step (4) (for instance microfiltration: reactor size about 27 to 33 l/PE with a reactor volume of 20 $kg_{oTS}/m^3$, sharp rises in activity, against which counter-measures might be provided, may occur. Preferably, they are buffered in a self-regulatory manner by buffer substances buried in the reactor and provided with correspondingly reactive surfaces.

Preferably a suitable amount of nitrified black water and/or urinal waste water and/or faecal waster water is supplied via (3b) and/or (5a) to the preceding solids/liquid separation process in order to accelerate anaerobic denitrification. In this way, the solids are transported to the surface by the gas bubbles ($N_2$) that form and can be removed. The denitrifying bacteria can also be added via (III) and/or (5a). In the case that the solids/liquid separation process is carried out in the same apparatus, the separated bio mass or necessary partial amount can also remain in the apparatus.

Preferably, the process proceeds as follows:
a) solids/liquid separation (process step (2) & denitrification,
b) oxidation by microorganisms (process step (3)), and
c) solids/liquid separation (process step (4))

Operation is sequenced in batches (in a manner similar as in SBR) in two alternately charged reactors preferably equipped with buffer containers. In the case of a high load oxidation reactor (process step (3), second paragraph) it can be charged in batches and floated with subsequent anaerobiosis.

Preferably, all three process steps are carried out in the same apparatus.

In the temperature range of below about 28° C., the metabolic kinetics of Nitrosomonas ($NH_4^+ \geq NO_2$) are slower than those of Nitrobacter ($NO_2^- \geq NO_3^-$). Thus, the $NO_2^-$ formed in the oxidation reactor is quickly metabolized and the formation of toxic $HNO_2$-N is prevented. However, in the higher temperature range the metabolic rate of Nitrosomonas is faster than that of Nitrobacter. Thus, $HNO_2$-N can accumulate in the reactor and inhibit the nitrification process. As the target groups of the process herein proposed include hotel buildings in hot and sunny areas, and since the very reactor is heated up by the oxidation heat released, it might be necessary to take suitable counter measures (for instance to design the process as a multi-step process, use cooled aeration air, increase the concentration of the activated bio mass, or adapt the bacteria population slowly).

(4) The liquid product from (3) is now subjected to further solids/liquid separation. It can be carried out simultaneously in process step (3) by means of suitable filtration processes, in order to increase the bio mass in (3) independently from the sedimentation limit. In this connection the following requirements must be met:
the active bio mass of the activated sludge should be held back,
pathogenic bacteria and microorganisms should be held back,
and humic acids that form and other macromolecules should be held back.

However, all other solids/liquid separation processes (for instance sedimentation) can be used as well, which, however, influence the whole course of the process. For instance, after process step (4) and before optional process step (5), one or more mechanical, physical, chemical and/or oxidatively biological process step can be inserted.

Excess sludge (7a) can be supplied to the bio gas plant via (3c) either together with or separately from the raw sludge of the black water.

A characteristic feature of the process is the activated sludge tank (7b) which allows the necessary concentration of active bio mass in the oxidation apparatus to be appropriately adjusted depending on the day profile of the amounts and loads of the accruing black water in conjunction with an oxygen supply adjusted to the demand (7c), in order to ensure a constant drainage quality. This leads to a substantially smaller dimensioning of the reaction volumina and a more stable course of the process compared to that of the prior art. The process can be computer-controlled and/or an be DFU-(remote data transmission)-controlled. Operation can be monitored by sensors.

The demand-dependent and controllable bio mass concentration in the oxidation apparatus could have an influence on the special requirements of the process of the invention. For instance, the sharp rises in acidity and/or the accumulation of $HNO_2$-N in the oxidation apparatus could be counteracted by an appropriate supply of active bio mass and/or Nitrobacter-enriched bio mass from the activated sludge tank. This also enables the plant when adequately controlled to adapt to the day profile of loads even in the case of the smallest reactor dimension.

It is possible to take measures to prevent autolytic digestion of the biomass in the activated sludge tank (for instance cooling). Excess active bio mass of tank (7*d*) is directed to the bio gas plant.

(5) The liquid product from process step (4) can undergo an optional sanitation process. However, the choice of the suitable filtration process (4) can render it unnecessary.

After process step (5), another sanitation process step can be provided for. However, chlorination of the liquid product of (5) should be dispensed with, if possible, to avoid the risk of a high salt concentration in the black water cycle, in order for the mineral fertilizer that forms to remain pedologically safe.

(6) The product of (5) is a clear concentrated mineral fertilizer solution which can be reused via a tank to flush toilets and/or urinal. The open black water cycle is thus closed. In this way, the toilet water consumption of about 50 l/(PE*d) can be reduced to 0 l/(PE*d) as a maximum. The volume entering the black water cycle is about 1.5 to 2.2 l/(PE*d) from human excrements. The volume of liquid fertilizer exiting the cycle is calculated as entry volume minus sludge deductions and evaporization losses. If these deductions equal the entry volume or exceed it, it is necessary to add water to the cycle. Otherwise, the added amount of outside water is determined by the water consumption of the toilets and urinals and the biologically compatible nitrogen concentrations in the oxidation reactor.

(7) A final product of highly concentrated odorless liquid mineral fertilizer is formed which can be stored and/or used for fertilizing. The carbon portion in the mineral fertilizer solution is so low that hardly any denitrification processes occur.

The small volume allows drying and the subsequent further processing and/packaging of the mineral fertilizer can be part of the process. In the case that the liquid nutrient solution is stored, care should be taken to ensure darkness and absence of air, as otherwise photoautotrophic and/or chemoautotrophic organisms might grow, which might cause noticeable nitrogen looses by the supply of carbon and subsequent denitrification.

(8) The general rule is that a combination of oxidized and nitrified nitrogen-containing waste water and carbon-rich fermentation broth immediately leads to great denitrification processes and thus to great nitrogen losses.

As shown, the nitrogen can be separated by the solids/liquid separation process (2) before fermentation of the carbon.

Process step (8) now shows the process using urine separation toilets. Under these conditions too, the separately collected faecal waste water should be subjected to solids/liquid separation, in order for the volume of the bio gas plant to be kept small. If the liquid supernatant is to be oxidized, so as to close the black water cycle and to oxidize $NH_4$-N to $NO_3$-N, because odorous nitrogen stripping is thus prevented, it is possible to reunite the urinal waste water with the faceal water supernatants, as the same applies to the urinal waste water. Hence, the use of separation toilets in the case of oxidative recovery of the nutrients (mineral fertilizer ($KNO_3$, $P_2O_5$, $K_2O$, etc.) makes little sense.

The use of urine separation toilets in the present process makes only sense, if the nutrients of the urine waste water are to be recovered anaerobically. In that case of urine, after having been subjected to filtration in order for pathogenic microorganisms to be removed, can be combined with the digested fermentation broth from the bio gas plant (8*a*), without this leading to denitrification processes.

After filtration, the pure urinal waste water can be directed separately to drying and/or utilization (recovery) and/or further processing (8*a*). Its concentration by reverse osmosis is also useful.

Also, the proper use of MAP precipitation (magnesium ammonium phosphate), or other precipitation processes in the urinal waste water optionally after sanitation would be conceivable. In a precipitation process in the acidic medium it would be useful to subject the urinal waste water prior to reuniting it to anaerobic hydrolysis for the purpose of acidification so as to change the $NH_3$–$NH_4^+$ solubility balance in the urinal waste water in favour of the $NH_4^-$ concentration.

Adsorptive processes for ammonium (such as clay minerals, zeolite, etc.) can also be useful and thus form part of the process. Moreover, combinations of precipitation, adsorption and/or drying are possible.

Furthermore, sterilization or sanitation steps before, after or instead of filtration would be conceivable.

The solids/liquid separation of faecal waste water continues to be useful, so as to keep the volume of the bio gas plant small. In this case, the oxidation of faecal waste water from process step (3) can be performed with a substantially lower energy consumption because of the absence of about 88% of the nitrogen, than in combination with the urinal waste water, and this would result in a substantial reduction of the operation costs of the oxidation apparatus in the black water cycle. The reactor size of the oxidation apparatus would also be distinctly smaller. The reductive nutrient recovery of the urinal waste water is a good supplement of the oxidative nutrient recovery from faecal waste water and avoids the problems of the above-described process steps (3) and (4). However, nitrogen losses due to escaping $NH_3$ gas must be expected.

The bio waste stream

In the following, the bio waste stream and its interaction with the gray and black water cycles are described. In summary, this partial stream of the process aims at a high bio gas yield and high sanitation of the organic material.

(I) In hotels, bio waste of is generated only in a few places, and can thus often be separated without having to be sorted out. Bio waste is generated primarily in large kitchens restaurants gardens and parks Once the personnel has received corresponding instruction, a high degree of homogeneity of the kinds is easy to achieve. In this respect, the separation is provided as an optional process step. However, the separation of the residual material by gravity separation or other methods can also be provided as an additional process step at a different stage in the bio waste stream (for instance (III)). The residual or interfering materials are separated and can be further processed.

(II) The bio waste which should be as homogeneous as possible regarding kinds is now subjected to fragmentation. Fragmentation can be carried out with or without the sludges from the black water stream ((2b), (3a), (7d) and/or (7a)). Preferably, bio waste fragmentation is carried out without the sludges by means of a "cutter", as used in large butcheries for sausage production. Cutters perform very good fragmentation and homogenization of the bio waste.

(III) The sludges separated from process steps (3a) and (7a) are for instance mixed with the fragmented bio waste and subjected to hydrolysis. If the total black water, instead of the black water sediment from (3a), were used with the bio waste for fermentation (or urinal waste water separation, and (3) being added to (3a) and (3c)), the high nitrogen concentrations could endanger the methanation process in the bio gas plant. Sedimentation of the black water for separating the nitrogen (urea) prior to fermentation is thus recommendable from a process technological point to view without the use of urine separation toilets. Moreover, sedimentation permits a reduction of the required size of the bio gas plant.

If urine separation toilets are used, the total faecal waste water can be directed into the bio gas plant ((3) via (3a) and (3c)), without there being any danger that the methanation process is inhibited, as more than 80% of the nitrogen are dissolved in the urine. This would result in the sanitation of the faecal waste water and an increase in the bio gas yield, but also in a substantially greater dimension of the bio gas plant.

Hydrolysis is preferably thermophilic with a suitable retention time, in order to achieve the simultaneous sanitation of the organic material.

(IV) In this process step, the hydrolyzed material is preferably subjected to mesophilic methane fermentation. Methane fermentation is the interface to the gray water module. The material separated from the kitchen waste waters by fat separators or flotation processes is directly charged into the methane fermentator, as the hydrolysis of fats is the rate-limiting step in the anaerobic catabolism of fats.

(V) The digested fermentation broth can now be subjected to an optional solids/liquid separation process. The liquid supernatant contains many nutrients and can be directed to oxidation (3) (VII), or, preferably prior to filtration, to the reductive process line of the urinal waste water (VIIb).

(VI) The digested product from (V) or (VI) can now be directly recovered, dried, or further processed. In the case of composting, the water or irrigating the compost can be drawn from the gray water, or from treated faecal and/or urinal waste water. It is then collected and can be subjected to oxidation via process step (VIIIa) or directed to the reductive urinal waste water stream.

(VII) The supply of liquid from (VII) and/or (VIIa) allows liquid losses of the black water cycle to be compensated for. The compost water cycle is described in FIG. 3.

FIG. 2: The Gray Water Stream

Introductory Description of the Process

This partial stream of the process aims at the production of highly purified water for domestic use. The final goal may be the production of potable water from gray water or from partial streams of gray water. This goal can be attained by membrane filtration using reverse osmosis and/or micro- and/or ultrafiltration with subsequent salt removal. Regarding the membranes it is necessary to ensure that they have the suitable pore size; for instance for residual COD (chemical oxygen demand) solids retention, sanitation etc. After optional sedimentation, the carbon in the gray water is first removed by wet oxidation (possibly with the addition of black water nutrients) or by other biological, chemical or physical processes. Nitrogen and phosphorus need not be removed, but their removal may be brought about by other processes (for instance precipitation of the carbon) or may be provided for as (a) separate, biological, chemical or physical process step(s).

The activated sludge generated in biological carbon degradation is fixed (fixed bed process) or is recycled (activated sludge process). Excess sludge or precipitated sludge is separated by conventional solids/liquid separation processes, and can, for instance, be directed to a bio gas plant.

The scarcely degradable CSB fraction remaining in the liquid phase can be oxidized to $CO_2$ by ozonization or other processes, and/or can be removed by other biological, chemical or physical processes. After optional further solids/liquid separation (for instance filtration), the substances remaining in the gray water are subsequently removed by activated charcoal filtration or by other processes (for instance filtration or adsorption processes). As gray water contains relatively few salts, salt removal (for instance reverse osmosis) is not evisaged e.g. in the case of a permanent admixture of salt-low potable water in areas with heavy rain falls, but can be a process step. In areas with extreme water shortage, the oxidized gray water can be processed to provide water in the often already existing sea-water desalinization plants in a multifunctional manner; simultaneous retention of salts, pathogenic microorganisms, and nutrients possibly still present and residual CSB can be achieved.

After sanitation and optional chlorination it is directed to the potable water tank. Sanitation and chlorination are optional process measures.

A process step to modify or neutralize the water structure can be inserted here at a suitable stage (for instance after activated charcoal adsorption). The process can comprise a ground water passage in order to comply with legal requirements but this passage is not necessary from the point of view of process technology.

Description of the Process on the Basis of FIG. 2

The dashed boxed or lines and arrows in FIG. 2 also represent options and variants of the process.

(1) Usual mechanical and/or physical and/or chemical pretreatment processes of gray water or one or more of its partial streams (for instance rake separators, sand separators and separators of light weight materials etc.) can be carried out first. In this case, a division of the gray water into gray water partial streams according to their origins and pollution characteristics seems to be more expedient.

(2) The kitchen wastes contain fats, oils, floating and sedimentable solids and tensides and dissolved, organic substances. The pretreatment recommended here is a flotation process by which the fats, oils, the floating and sedimentable solids, and some of the dissolved BOD (biological oxygen demand) solids and COD (chemical oxygen demand) solids are withdrawn and can be directed into the methane fermentator of the black water and bio waste module. It is also possible to use fat separators, filtration, precipitation and other separation processes here.

(3) It would be worth considering separately collecting the waste water from the kitchen operation (2) and the kitchen waste waters (3) and subsequently performing coarse/fine screening because of the particular pollution characteristics. Also, a separation of the kitchen cleaning waste waters (3) from the gray water stream and/or separate purification because of the aggressive cleansing substances is possible.

(4) Hair and other fibre-like substances are found apart from tensides and the like in the gray water sources, such as showers, wash basins, bath tubs and washing machines. Moreover, nitrogen admixture of human origin must be taken into account here. Hence, the joint collection and pretreatment with a coarse screen and fine screen process of the gray water sources is recommended here ("Washing").

(5) The section "pool and/or remainder" consists of the recycle sludges from the pool water purification plant, the very pool water which is to be exchanged, and other gray water sources, mostly in the outdoor area. The human user leaves body oils, nitrogen and other nutrients there as well as salts which are perspired through the skin but are also introduced by the chlorination of the pool water. Because of its permanent chlorination, pool water involves no danger of epidemics, and therefore this gray water can be used without further processing to water close by green areas and can be applied there as a fertilizer without any danger of overdosing, (compared to black water its N-loads are low).

(6) The low nutrient content of the gray water stream "pool" and/or "remainder" would, however, also be suitable in the subsequent oxidation step (oxidation by microorganisms and/or carbon removal) of the other gray water streams, and therefore fine screening and/or filtration and subsequent direction towards oxidation would be expedient.

(7) The pretreated gray water streams are reunited prior to oxidation (oxidation by microorganisms and/or carbon removal) and are subjected to a suitable oxidation process using microorganisms (aerated sand filter, planted soil filter, vertical intermittently charged soil filters without plants, etc.). In the case of nutrient shortage, a mineral fertilizer solution from the black water cycle may be added here. After process step (7) and before process step (8), one or more mechanical, physical, chemical and/or biological purification steps may be inserted.

(8) The liquid product form (7) is now purified by a desalinization plant. In this manner, the following objects can be achieved at the same time:
retention of the salts
retention of the residual bio mass
retention of the CSB residue
sanitation As in many touristic areas potable water is obtained from sea-water desalinization plants, the purified gray water can be mixed together with sea water or can be separately and centrally processed to potable water in a desalinization plant at favourable conditions because of the low osmotic pressure. The salty residue of the desalinization plant is directed into the sea (14).

(9) The product from (8) can now be subjected to sanitation (process steps (12) and (13)) or optionally subjected to a process for changing the water structure.

(10) The purified gray water can be chlorinated as an additional safety measure prior to its reuse and/or storage (11).

Figure 3:
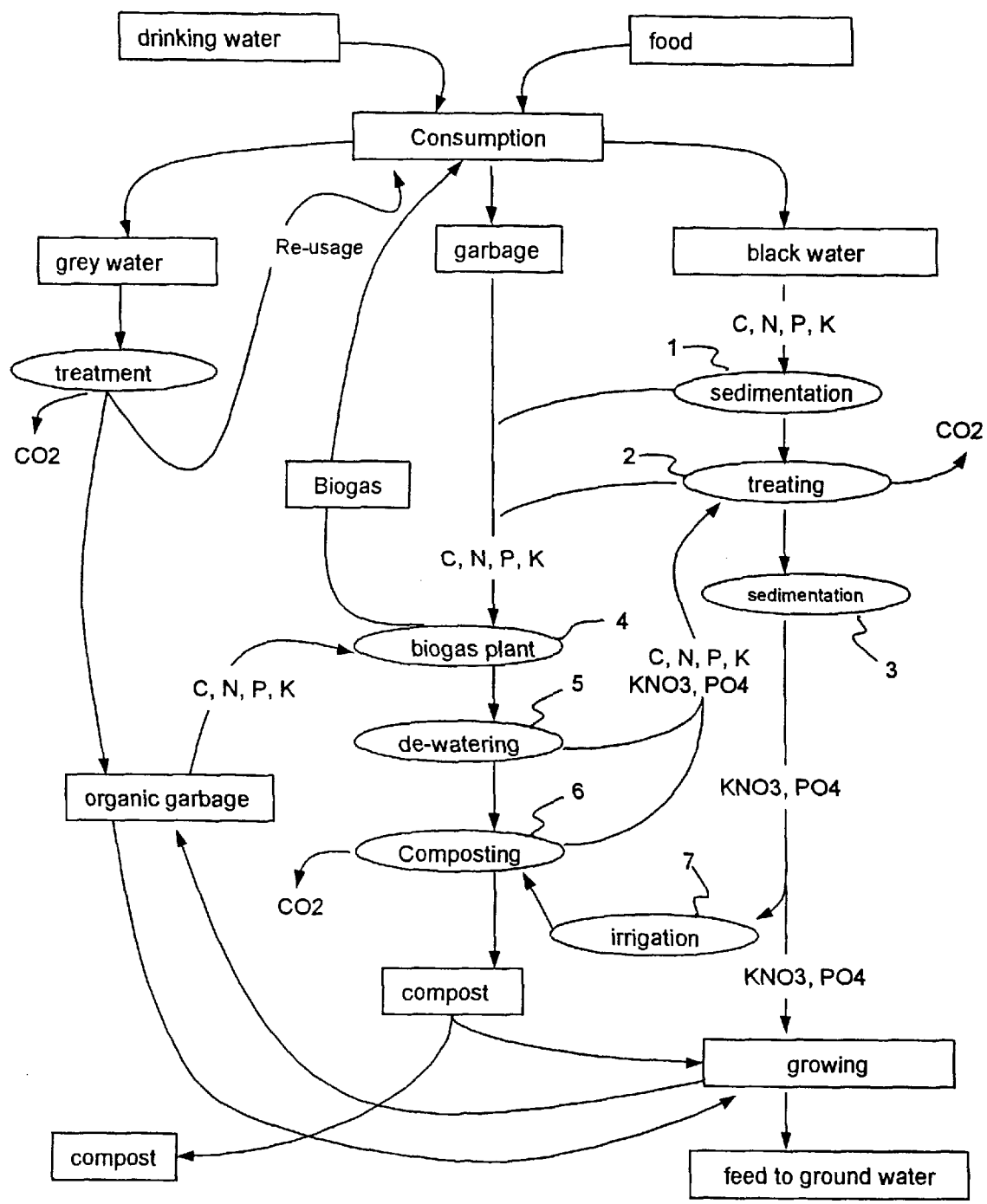
FIG. 3 shows the cycle of the nutrients between collection and utilization. It, in particular, shows the cycle of compost water and achievable nutrient concentration.

FIG. 3: Flow Diagram of the Black Water Components

FIG. 3 shows the black water sedimentation and the oxidative nutrient withdrawal from the bio waste stream as a flow diagram. C, N, P, K stand for the reduced organic compounds of these elements, $CO_2$, $KNO_3$ and $PO_4$ stand for the oxidized ones. $CH_4$ stands for the withdrawal of carbon as energy carrier (bio gas).

Carbon: A Valuable Energy Carrier

Carbon must be removed from the waste water. This is done in two ways: First, by sedimentation (1) (sludge is heavier than water) and secondly by subjecting the residual solute carbon to biological "burning" (2) by bacteria. Hence, the bulk of the carbon is now present as a sludge and garbage ((1) & (2)). One possibility is to compost them (6) which is also a biological burning of the biologically easily degradable carbon compounds. This release much energy. Everyone knows the steaming compost heaps in rural areas. However, this waste heat from composting can hardly be used. Another possibility is the fermentation of easily degradable carbon compounds under air seal (4). As oxygen is no longer present, bio gas ($CH_4$) is now formed instead of $CO_2$. This energy carrier can be used in many ways.

As not all carbon compounds can be degraded under air seal, the digested organic material can subsequently be composted (6) and in this manner a compost whose quality is even superior to that of the previous one is obtained.

N, P & K: Elixir of Life for Areas Under Cultivation

Plants assimilate nitrogen in two forms via their roots: As nitrate $NO_3$, or as ammonium $NH_4$, phosphorus is assimilated as phosphate $PO_4$ and potassium as potassium ion $K^+$. As a result of the biological "burning" of the carbon in the waste water (2), not only $CO_2$, but also high amounts of potassium, nitrate and phosphate are released, which, however, remain dissolved in the water.

These so-called problematic substances which must be removed at great expense if the purified waste water is directed into rivers or lakes, are highly welcome fertilizers in the case of areas under cultivation if the purified waste water is used for the irrigation of the areas under cultivation. Commercial mineral fertilizer consists of salpeter $KNO_3$, that is to say potassium nitrate and phosphate $PO_4$. Exactly these substances are produced by the process and can be applied to the area under cultivation in solute form.

In the irrigation (FIG. 3: (7), FIG. 1: (VIIc)) of the composting step (FIG. 3: (6), FIG. 1: (VI)), not only potassium, nitrate and phosphate but also carbon substances are washed out; they are removed by directing the "compost water" again to the aerobic treatment step (oxidation by microorganisms and/or carbon removal) (FIG. 3: (2), FIG. 1: (VIIa)). In this manner, the organically bound nitrogen present in the irrigation water of the composting step (FIG. 3: (6), FIG. 1: (VI)) and/or present in the drainage water from the drainage step (FIG. 3: (5), FIG. 1: (V)) of the bio gas plant is oxidized to nitrate, and thus leads to a high nutrient-enrichment in the effluent of the waste water treatment plant via the circulation system of the water.

In this manner, a maximum concentration of plant nutrients in the clear and pure irrigation water is achieved.

Figure 4:
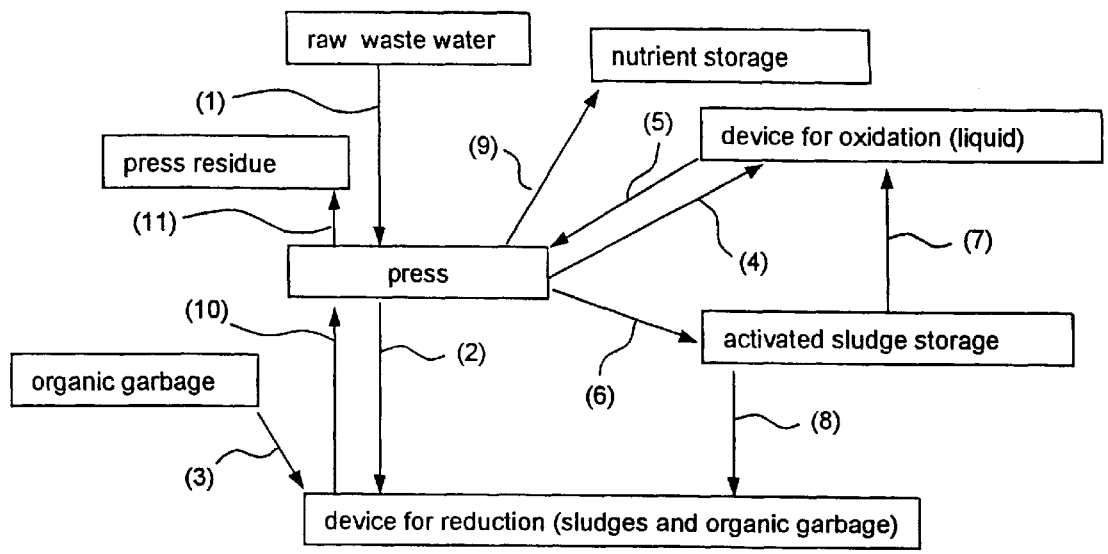
FIG. 4 shows an example of a possible compact design of the black water module apparatus of the invention. It, in particular, shows an activated sludge tank which allows the total module to adapt flexibly to the day profile of amounts and loads produced in a hotel or residential area etc.
Figure 5:
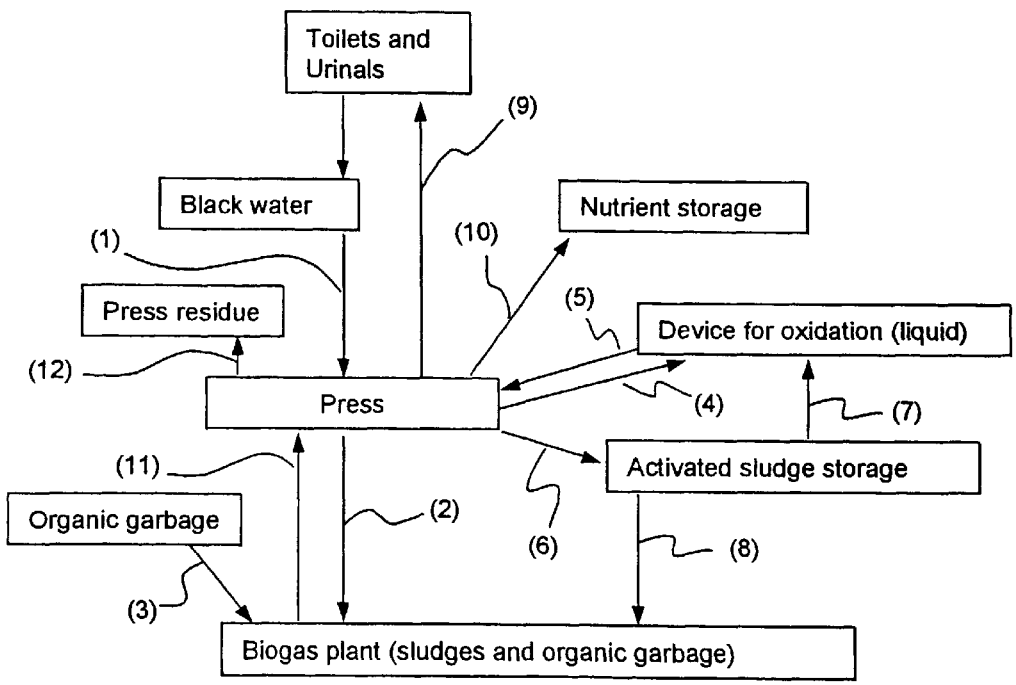
FIG. 5 shows an example of the black water cycle in the embodiment of this compact black water module.

FIG. 4 and FIG. 5: Black Water Nodule and Bio Waste Module with Multifunctional Solids/Liquid Separation FIG. 4 shows the use of the process as a compact module which can be placed into basements. In non-vegetation periods (winter) and production of mineral fertilizer may be undesirable.

Another feature of the process is the dentrification step, which can be added or omitted, and the biological phosphate removal, as the application of nutrients on green areas is not desirable in the winter.

The process is now explained in more detail on the basis of FIGS. 4 and 5: The raw waste water or preferably black water is directed via conduit (1) into a chamber filter press. This chamber filter press can be replaced with other conventional solids/liquid separation processes. The solids-containing filtrate can be adjusted with the solids/liquid separator to a desired dry substance content, which is desirable to reduce the volume of the reduction apparatus.

The solids-containing filtrate is directed via conduit (2) either separately or together with the bio waste (3) into a reduction apparatus for anaerobic conditioning and production of bio gas.

After digestion of the organic material, the fermentation broth is again directed into the solids/liquid separator via the conduit (FIG. 4: (10), FIG. 5 (11)). The filter cake thereby formed (FIG. 4: (11), FIG. 5: (12)) can be disposed of in a garbage bin, applied in the garden or processed further.

A. Nutrient Utilization

The liquid filtrates from (FIG. 4: (11), FIG. 5: (12)) and (1) are directed to the oxidation apparatus (oxidation by microorganisms and/or carbon removal) via conduit (4), if nutrient processing and recovery or storage is desired. In the oxidation (oxidation by microorganism and/or carbon removal) the carbon compounds are oxidized to $CO_2$ and the nutrients are mineralized to $KNO_3$, $K_2O$, $PO_4$, etc. After complete oxidation, the active bio mass thereby formed is directed via conduit (5) to the solids/liquid separator and pressed. Here, too, the desired dry substance contents can be adjusted. The solids-free, mineralized black water is reused for toilet flushing via conduit (9) (FIG. 5). Thus, the black water is directed in an open cycle, in which the nutrients are concentrated.

The present bio mass is directed to an activated sludge tank via conduit (6). Measures to prevent the autolytic digestion of the bio mass can be taken in the activated sludge tank. If the demand of active biomass in the oxidation apparatus is high, (in the case of high throughputted amounts and/or of a high degree of pollution) the concentrated active bio mass is directed to the oxidation apparatus and the oxygen supply is increased accordingly, and the degradation speed is thus increased. Excess active bio mass is directed to the reduction apparatus via conduit (8).

B. No Nutrient Utilization

If nutrient utilization is not desired, the oxidized nitrogen ($NO_3$), following complete oxidation, is denitrified by conventional processes for instance in the oxidation apparatus, and phosphorus is biologically fixed or removed otherwise. This is preferably done in the oxidation apparatus, which becomes the reduction apparatus by switching off aeration and stirring. In this process, carbon can be provided via conduit (4) and admixed. In a particularly preferred embodiment, denitrification by the high nitrate concentrations available from the black water cycle can be used for flotation in the first solids/liquid separation of the black water and/or faecal waste water. As a high concentration of facultatively anaerobic bacteria is found in the activated sludge tank, denitrification can be increased very efficiently by the addition of active bio mass also via conduit (7).

If necessary, intermittent aeration can be applied and/or additional solids/liquid separation steps can be carried out within the degradation process. Excess active bio mass is directed to the reduction apparatus via conduit (8).

What is claimed is:

1. A process for utilizing waste waters; the process comprising:
   (a) separately collecting gray water, or one or more partial streams thereof, and black water, or faecal discharges and urinal discharges;
   (b) selectively performing solids/liquid separation of the gray water and the black water or the faecal discharges and urinal discharges separately collected in (a);
   (c) selectively performing oxidation by microorganisms of the liquid phases of the gray water and the black water or the faecal discharges and urinal discharges obtained in (b); and
   (d) selectively performing solids/liquid separation of at least one of the liquid phases obtained in (c).

2. The process according to claim 1, further comprising:
   after (c) or (d), creating a mixture by selectively mixing the gray water, or the one or more partial streams thereof, with sea water; and
   subsequently desalting the mixture in a desalinization plant.

3. The process according to claim 1, further comprising selectively subjecting solids from the gray water and the black water or the faecal discharges and fragmented bio waste to one or two-step anaerobic digestion.

4. A process for utilizing waste waters; the process comprising:
   (a) separately collecting gray water and black water, wherein the black water is collected from toilets with or without urinals;
   (b) performing membrane filtration of the gray water separately collected in (a), and
      (ba) separately performing solids/liquid separation of the black water separately collected in (a);
   (c) performing oxidation by microorganisms of the liquid phases obtained in (ba);
   (d) performing solids/liquid separation of the product obtained in (c);
   (e) selectively utilizing the liquid phase obtained in (d) for at least one of
      (i) collecting black water according to (a); and
      (ii) as mineral fertilizer; and
   (f) optionally repeating (a) through (e) one or more times.

5. The process according to claim 4, wherein the separately collecting in (a) further comprises collecting the black water separately as a faecal waste water partial stream and a urinal waste water partial stream, and wherein the faecal waste water is treated according to steps (a) to (f).

6. The process according to claim 5, further comprising adding at least a part of the urinal waste water to the faecal waste water prior to (c).

7. The process according to claim 6, wherein the separately performing solids/liquid separation in (b) further comprises a flotation process if steps (a) to (e) are repeated one or more times.

8. The process according to claim 5, further comprising selectively performing, prior to (c), one or more mechanical, physical, and chemical purification steps.

9. The process according to claim 8, wherein the performing solids/liquid separation in (d) comprises performing a filtration process.

10. The process according to claim 5, wherein the separately performing solids/liquid separation in (b) comprises performing a sedimentation or filtration process.

11. The process according to claim 5, further comprising selectively storing the product of (d) in a tank, and in the case of higher performance demand, selectively re-supplying the contents of the tank to an oxidation apparatus performing (c) under increased air supply.

12. The process according to claim 5, further comprising selectively subjecting the oxidized black water or the faecal waste water to sanitation and modification of the water structure prior to reutilization.

13. The process according to claim 5, further comprising selectively removing solids from the urinal waste water partial stream by filtration.

14. The process according to claim 4, further comprising depositing the mineral fertilizer into containers.

15. The process according to claim 4, wherein steps (b), (c), and (d) are carried out in an apparatus comprising a reactor; the reactor comprising membranes for solids/liquid separation and apparatuses for aerating, stirring, measuring, and adjusting the pH value of the contents of the reactor; and wherein the apparatus is hydraulically connected to a storage container to which and from which active bio mass of the reactor can be supplied.

16. A process for producing potable water from gray water or from one or more partial streams thereof, the process comprising:

(a) separately collecting gray water or one or more partial streams thereof and creating a mixture by selectively mixing the gray water, or the one or more partial streams thereof, with sea water;

(b) selectively performing membrane filtration of the mixture; wherein the membrane filtration is carried out by one of reverse osmosis, ultrafiltration, or microfiltration; and (c) selectively performing desalinization of the mixture where the membrane filtration in (b) is carried out by ultrafiltration or microfiltration.

17. The process according to claim 16, wherein the selectively performing membrane filtration comprises utilizing membranes having a pore size of at the most up to 2 $\mu$m.

18. The process according to claim 17, wherein the selectively performing membrane filtration comprises utilizing membranes having a pore size of at the most 0.2 $\mu$m.

19. The process according to any one of claims 4, 16, 17 or 18, further comprising selectively performing, prior to (b), one or more mechanical, physical, and chemical purification steps.

20. The process according to claim 19, further comprising selectively performing, subsequent to (a):

(i) solids/liquid separation; and (ii) carbon removal.

21. The process according to claim 20, further comprising selectively performing solids/liquid separation subsequent to (ii).

22. The process according to claim 20, wherein the solids/liquid separation in (i) comprises selectively performing one of flotation, sedimentation, filtration, or precipitation.

23. The process according to claim 19, wherein the selectively performing one or more purification steps comprises performing a process of carbon removal carried out by oxidation by microorganisms.

24. The process according to claim 16, further comprising depositing the potable water into containers.

25. The process according to claim 16, wherein steps (b) and (c) are carried out in an apparatus; the apparatus comprising a separator in which the process steps are carried out, and wherein the apparatus further comprises equipment for carrying out the desalinization.

26. The process according to claims 4 or 16, further comprising selectively performing sanitation and modification of the water structure of the gray water or one or more partial streams thereof recovered in (b).

27. The process according to claim 26, wherein the selectively performing sanitation comprises performing a chlorination treatment.

* * * * *